(12) United States Patent
Egedal et al.

(10) Patent No.: US 11,920,564 B2
(45) Date of Patent: Mar. 5, 2024

(54) CONTROLLING OF SEGMENTED ADD-ON MEMBERS OF A WIND TURBINE BLADE

(71) Applicant: Siemens Gamesa Renewable Energy A/S, Brande (DK)

(72) Inventors: Per Egedal, Herning (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/299,909

(22) PCT Filed: Oct. 31, 2019

(86) PCT No.: PCT/EP2019/079814
§ 371 (c)(1),
(2) Date: Jun. 4, 2021

(87) PCT Pub. No.: WO2020/120009
PCT Pub. Date: Jun. 18, 2020

(65) Prior Publication Data
US 2022/0034297 A1    Feb. 3, 2022

(30) Foreign Application Priority Data

Dec. 13, 2018  (EP) .................................... 18212388

(51) Int. Cl.
*F03D 7/02*     (2006.01)
*F03D 1/06*     (2006.01)

(52) U.S. Cl.
CPC ......... *F03D 7/0232* (2013.01); *F03D 1/0633* (2013.01); *F03D 7/0224* (2013.01); *F05B 2240/3052* (2020.08); *F05B 2270/327* (2013.01)

(58) Field of Classification Search
CPC .......... F03D 7/02; F03D 7/022; F03D 7/0224; F03D 7/0232; F03D 7/0252; F03D 7/04;
(Continued)

(56) References Cited

U.S. PATENT DOCUMENTS 10,385,826 B2 * 8/2019 Butterworth ............ F03D 7/042
10,968,888 B2 * 4/2021 Christensen .......... F03D 7/0232
(Continued)

FOREIGN PATENT DOCUMENTS

CN  102996331 A  3/2013
CN  105443313 A  3/2016
(Continued)

OTHER PUBLICATIONS

Extended European Search Report and Written Opinion of the European Searching Authority dated Jul. 9, 2019 for Application No. 18212388.5.
(Continued)

*Primary Examiner* — Courtney D Heinle
*Assistant Examiner* — Sang K Kim
(74) *Attorney, Agent, or Firm* — Schmeiser, Olsen & Watts LLP

(57) ABSTRACT

Provided is a wind turbine and to a method and a device for controlling aerodynamic properties of a blade of the wind turbine, the blade including a predetermined number of add-on members which are actuated by a corresponding trim actuator to alter the aerodynamic properties of the blade, wherein each trim actuator is configured to hold the add-on member in a predetermined first position and a predetermined second position. The control device is configured to determine a first number of add-on members which are to be held at the predetermined first position, and to determine a second number of add-on members which are to be held at the predetermined second position.

10 Claims, 3 Drawing Sheets

(58) Field of Classification Search
CPC .......... F03D 7/041; F03D 7/042; F03D 7/043; F03D 7/044; F03D 7/045; F03D 1/0633; F05B 2240/3052; F05B 2270/327
See application file for complete search history.

(56) References Cited

U.S. PATENT DOCUMENTS

| | | |
|---|---|---|
| 11,078,885 B2 * | 8/2021 | Akay .................... F03D 7/0232 |
| 2007/0003403 A1 | 1/2007 | Pedersen et al. |
| 2012/0141271 A1 | 6/2012 | Southwick et al. |
| 2014/0271184 A1 * | 9/2014 | Baker .................... F03D 7/024 |
| | | 416/1 |
| 2016/0084223 A1 | 3/2016 | Gonzalez et al. |
| 2023/0142969 A1 * | 5/2023 | Esbensen .............. F03D 7/0296 |
| | | 416/23 |

FOREIGN PATENT DOCUMENTS

| | | |
|---|---|---|
| EP | 2 128 385 A2 | 12/2009 |
| EP | 2 778 400 A2 | 9/2014 |

OTHER PUBLICATIONS

International Search Report and Written Opinion for PCT/EP2019/079814 dated Jan. 17, 2020.

* cited by examiner

CONTROLLING OF SEGMENTED ADD-ON MEMBERS OF A WIND TURBINE BLADE

CROSS-REFERENCE TO RELATED APPLICATIONS

This application claims priority to PCT Application No. PCT/EP2019/079814, having a filing date of Oct. 31, 2019, which is based on EP Application No. 18212388.5, having a filing date of Dec. 13, 2018, the entire contents both of which are hereby incorporated by reference.

FIELD OF TECHNOLOGY

The following relates to a wind turbine. In particular, the following relates to a method and a device for controlling aerodynamic properties of blades of the wind turbine, wherein each blade comprises segmented add-on members.

BACKGROUND

It is very important to know the activation degree (state) of an active add-on device as it exhibits high impact on the blade aerodynamics, and thereby the overall turbine loading. If the state is not known, then it is not possible to predict the impact, and this complicates a simulation of loads, a control strategy design, and an approval process of a wind turbine.

It has been suggested altering an activation degree of the add-on member and then use an analog feedback to provide the state of the active add-on member. This approach requires a sensor located in the blade. However, the blade is a very bad environment for sensors as it has to be robust towards the high forces for the rotor rotation, blade movement/deformation, temperature and humidity variations, and severe risk of lightning strikes. Therefore, a sensor-less solution is preferred.

SUMMARY

An aspect relates to a method and a wind turbine for a sensor-less control of the aerodynamic properties of the blades.

According to a first aspect of embodiments of the invention, a control device is configured to control aerodynamic properties of a blade of a wind turbine, the blade comprising a predetermined number of add-on members which are actuated by a corresponding trim actuator to alter the aerodynamic properties of the blade, wherein each trim actuator is configured to hold the add-on member in a predetermined first position and a predetermined second position. The control device is configured to determine a first number of add-on members which are to be held at the predetermined first position, and to determine a second number of add-on members which are to be held at the predetermined second position. Advantageously, the active add-on members are operated without feedback about their positions. A fast transition between fully open and fully closed for each add-on member to operate with known aerodynamics is achieved in a digital on/off manner. A further advantage is a well-defined aerodynamic response and a very simple control of the active add-on members without the need of any feedback sensors in the blade.

In an embodiment, the predetermined first position is a closed position of the add-on member and the predetermined second position is an opened position of the add-on member. More preferred, the control device is configured to select specific add-on members of the second number on the basis of a trim activation signal which is determined based on a target rotor or generator speed reference.

That is, the trim activation signal can be calculated by a rotor speed controller which controls the rotor speed or some other controller objective. The trim activation signal may be a signal from 0 to 1 where 0 would result in no add-on member are activated, and 1 would result in all add-on members are activated. For example, a number in between would result in an activation of add-on members with either proportionality to a number of add-on members, an impact on a rotor torque taking varying operation parameters into account, an impact on a rotor thrust taking varying operation parameters into account.

According to embodiments of the present invention, the active add-on members of the blade are divided into a number of smaller add-on members, which can be controlled separately using a digital on/off approach. If the signal is ON, then the active add-on member is fully open. If the signal is OFF, then the active add-on member is fully closed. Fully opened refer to an open position with a known aerodynamic impact. Likewise fully closed corresponds to a closed position with known aerodynamic impact.

At positions in between fully closed and fully opened, the aerodynamic impact is known with lower certainty as e.g. the exact opening position. Thereby, a blade stall can be unknown or uncertain. If the transition between fully opened and fully closed occurs sufficiently fast, then the influence of the unknown aerodynamic impact during the transition becomes insignificant. A fast transition can be realized in a time being less than six to ten seconds.

In an embodiment, the control device is further configured to control a pitch angle of the blade based on a difference between the trim activation signal and a target trim efficiency reference. The target trim efficiency reference can be a signal that indicates a desired efficiency level of the add-on members. For example at high wind speed, it is desired that a pitch activation control device controls the blade pitch angle in such a way that the active add-on members have an efficiency level of 50%.

In an embodiment, the control device is configured to control aerodynamic properties of a plurality of the blades of the wind turbine, and the control device is configured to determine for each blade the first number of add-on members which are to be held at the predetermined first position, and to determine for each blade the second number of add-on members which are to be held at the predetermined second position.

According to a second aspect of embodiments of the invention, a wind turbine comprises a tower, a rotor, the rotor being mounted at the top of the tower to rotate about a rotational axis, wherein the rotor has a plurality of blades, and the above-described control device.

According to a third aspect of embodiments of the invention, a method of controlling aerodynamic properties of a blade of a wind turbine is provided, wherein the blade comprises a predetermined number of add-on members which are actuated by a corresponding trim actuator to alter the aerodynamic properties of the blade, wherein each trim actuator is configured to hold the add-on member in a predetermined first position and a predetermined second position. The method comprises steps of determining a first number of add-on members which are to be held at the predetermined first position, and determining a second number of add-on members which are to be held at the predetermined second position.

In an embodiment, a sum of the first and second numbers is equal to the predetermined number of the add-on members.

In an embodiment, the predetermined first position is a closed position of the add-on member and the predetermined second position is an opened position of the add-on member.

In an embodiment, the method further comprises a step of selecting specific add-on members of the second number on the basis of a trim activation signal which is determined based on a target rotor or generator speed reference. More preferred, the selected specific add-on members of the second number are altered over time. Thereby, the lifetime usage of the active add-on members can be balanced.

In an embodiment, the method further comprises a step of controlling a pitch angle of the blade based on a difference between the trim activation signal and a target trim efficiency reference. The target trim efficiency reference can be a signal that indicates a desired efficiency level of the add-on members. For example at high wind speed, it is desired that a pitch activation control device controls the blade pitch angle in such a way that the active add-on members have an efficiency level of 50%.

In an embodiment, the method controls aerodynamic properties of a plurality of the blades of the wind turbine, determines for each blade the first number of add-on members which are to be held at the predetermined first position, and determines for each blade the second number of add-on members which are to be held at the predetermined second position.

In an embodiment, the method further comprises a step of controlling a pitch angle of each blade based on the difference between the trim activation signal and the target trim efficiency reference.

In an embodiment, the predetermined first positions of each blade are identical and/or the predetermined second positions of each blade are identical. This ensures load symmetry when activating the segmented add-on members. This also reduces complexity as one pressure supply can drive the corresponding add-on members on all blades.

In an embodiment, the first numbers of each blade are identical and/or the second numbers of each blade are identical.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

Figure 1:
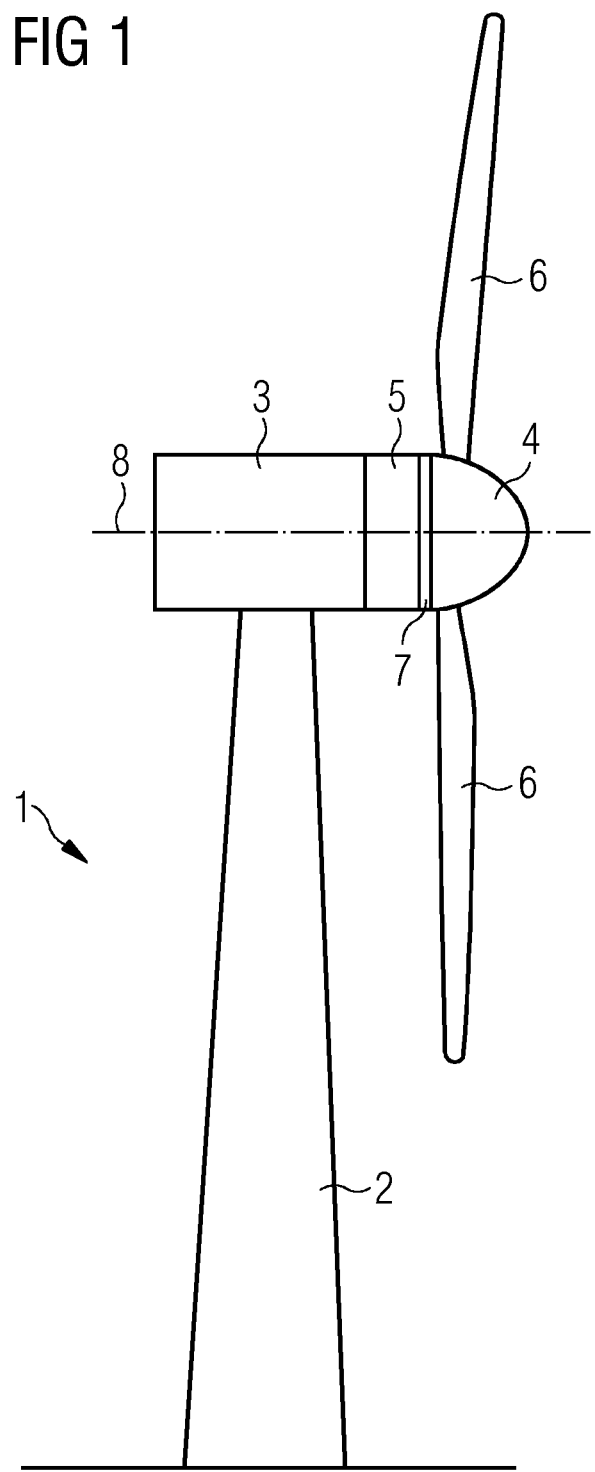
FIG. 1 shows a wind turbine and different elements thereof.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The blades are connected to the hub 4 via a joint section (not shown). The hub 4 is mounted rotatable with regard to the nacelle 3 by a main bearing 7. The hub 4 is mounted rotatable about a rotor axis of rotation 8.

The wind turbine 1 furthermore comprises a generator 5. The generator 5 in turn comprises a rotor 10 connecting the generator 5 with the hub 4. The hub 4 is connected directly to the generator 5, thus the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention is suitable for both types of wind turbines 1. The generator 5 is accommodated within the nacelle 3. The generator 5 is arranged and prepared for converting the rotational energy from the hub 4 into electrical energy in the shape of an AC power.

Figure 2:
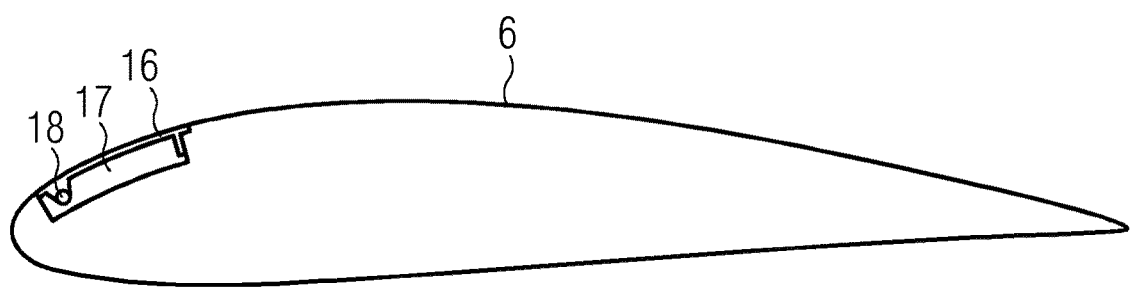
FIG. 2 shows a wind turbine blade having add-on members.

FIG. 2 shows a wind turbine blade 6 of the wind turbine 1. Each blade 6 has a plurality of active add-on members 17 which are actuated by a corresponding actuator to alter aerodynamic properties of the blade 6. The cross-section of FIG. 2 shows only one the active add-on members 17; however, the remaining active add-on members 17 of the blade 6 are arranged in front of or behind this active add-on member 17 as shown in FIG. 2.

The add-on member 17 are designed as spoilers. The spoilers 17 are here arranged near the front edge of the blade 6, but they can also be arranged near the back edge of the blade 6. The add-on members 17 are accommodated in recesses 16 in the blade 6 and can turn about hinges 18 by activation of the actuators. In FIG. 2, the spoiler 17 is shown in its normal deactivated position, where no spoiler effect and no stall is desired. This position is referred as a predetermined first position. The predetermined first positions of each blade 6 can be identical. This ensures load symmetry when activating the segmented add-on members 17. This also reduces complexity as one pressure supply can drive the corresponding add-on member 17 on all blades 6.

Figure 3:
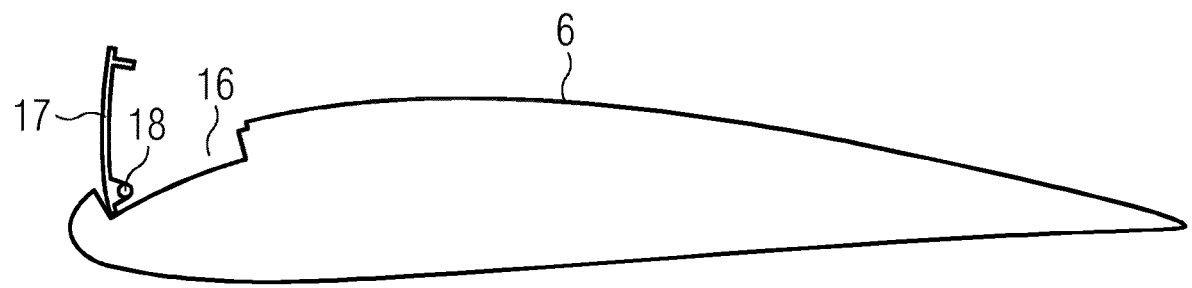
FIG. 3 shows the add-on member in an activated position, where the add-on member is turned to maximum stalling effect.

FIG. 3 shows the same add-on member 17 in an activated position, where the add-on member 17 is turned to a maximum by the actuator so that the stalling effect is maximum. This position is referred as a predetermined second position. The predetermined second positions of each blade 6 can be identical. This ensures load symmetry when activating the segmented add-on members 17. This also reduces complexity as one pressure supply can drive the corresponding add-on member 17 on all blades 6.

According to embodiments of the present invention, the add-on members 17 are not necessarily to be formed as spoilers. The add-on members 17 can have any other configuration which is able to alter the aerodynamic properties of the blade 6.

Figure 4:
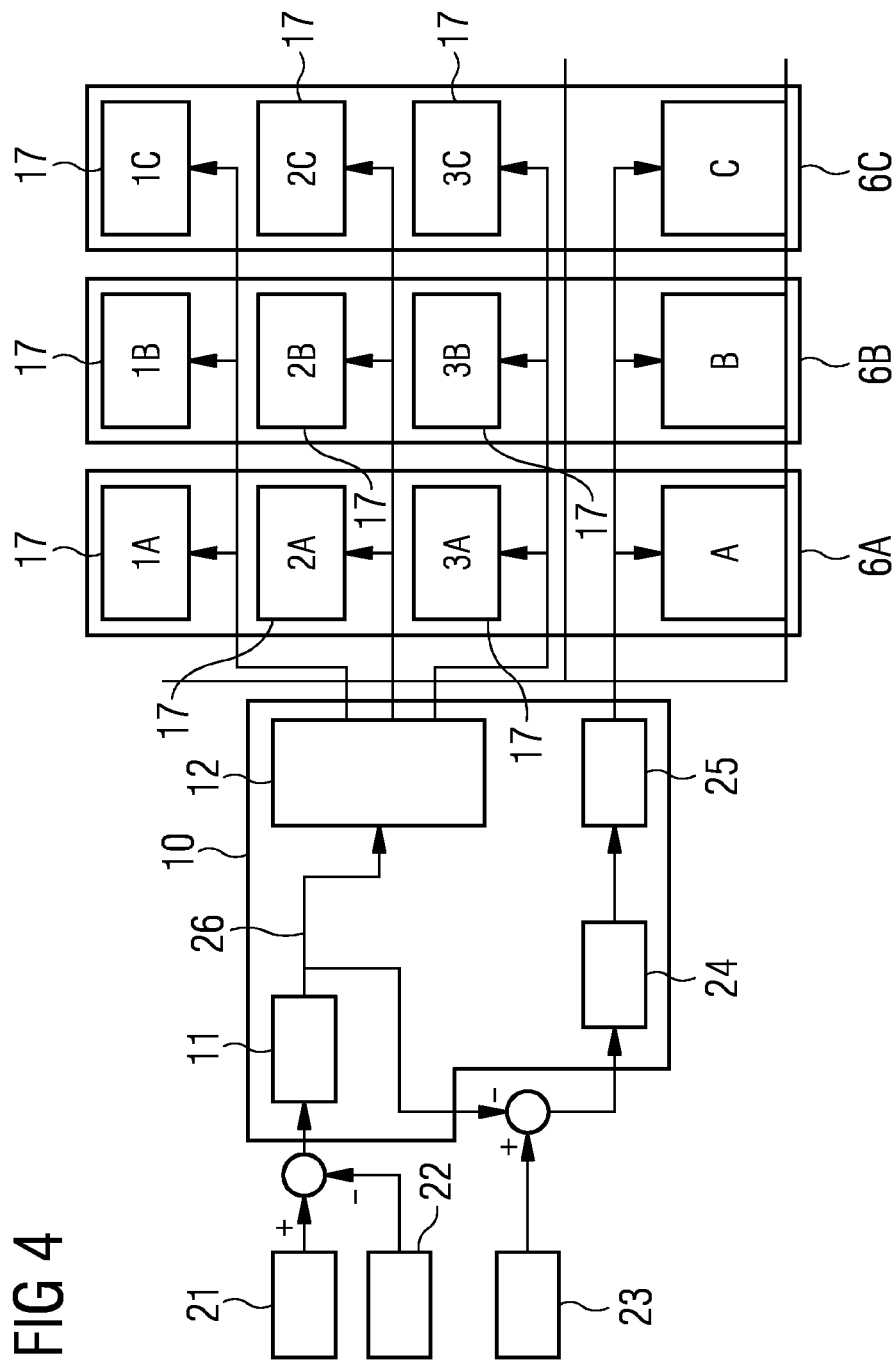
FIG. 4 shows an implementation of a control device for controlling aerodynamic properties of blades of a wind turbine according to an embodiment of the present invention.

FIG. 4 shows an implementation of a control device 10 for controlling aerodynamic properties of the blades 6 of the wind turbine 1 according to an embodiment of the present invention.

The wind turbine has three blades 6A, 6B and 6C. Each blade 6A, 6B and 6C has a number of n active add-on members 17, which are each formed as a segment. That is, the blade 6A has active add-on members 17 which are designated as segment 1A, segment 2A, . . . , segment nA; the blade 6B has active add-on members 17 which are designated as segment 1B, segment 2B, . . . , segment nB; and the blade 6C has active add-on members 17 which are designated as segment 1C, segment 2C, . . . , segment nC.

The number of segments is selected with respect to the step impact of one segment and the complexity of multiple segments. That means, if a very low number of segments is chosen, the aerodynamic impact of fully opening one segment is too large, which causes an undesired behaviour in turbine load. A very high number of segments increases the complexity and the number of control valves, tubing etc. Normally the number n of segments will be around 5 to 15 segments per blade 6.

A control device 10 determines for each blade 6A, 6B, 6C a first number of add-on members 17 which are to be held at the predetermined first position, and determines for each blade 6A, 6B, 6C a second number of add-on members 17 which are to be held at the predetermined second position. A sum of the first and second numbers can be equal to the predetermined number of the add-on members 17 of each blade 6A, 6B, 6C. The first numbers of each blade 6A, 6B, 6C can identical, and the second numbers of each blade 6A, 6B, 6C can be identical.

The control device 10 comprises an add-on member selection device 12 selecting specific add-on members 17 of the second number on the basis of a trim activation signal 26 which is determined based on a target rotor or generator speed reference 21. In more detail, the control device 10 comprises a trim activation control device 11 which outputs the trim activation signal 26 into the add-on member selection device 12. Into the trim activation control device 11, a difference between the target rotor or generator speed reference 21 and a rotor speed 22 is input.

FIG. 4 further shows that one activation signal is sent from the add-on member selection device 12 to the segments 1A, 1B, 1C of each blade 6A, 6B and 6C. Another activation signal is sent from the add-on member selection device 12 to the segment 2A, 2B, 2C of the blades 6A, 6B, and 6C, and so on.

The add-on member selection device 12 can alter the selected specific add-on members 17 of the second number over time. The altered selection of the second number of add-on members 17 balances the disadvantage of fixed quantities of an actuator impact versus a disadvantage of many add-on members 17. This can be achieved by rotating the use of add-on members 17 to avoid that one add-on member 17 is fatigue loaded more than others over time. The following implementations are conceivable: During activation, those add-on members 17 are selected that were inactive for the longest time; or during deactivation, those add-on members 17 are selected that were active for the longest time. Alternatively, activation statistics can be recorded and those add-on members 17 are selected which have been activated the least. Further alternatively, the add-on members 17 can randomly be selected.

Those add-on members 17, which have a status of fault, are not selected.

The control device 10 further comprises a pitch activation control device 24 and one or more pitch actuators 25 for each blade 6A, 6B, 6C. The pitch activation control device 24 and the pitch actuators 25 control for each blade 6A, 6B, 6C a pitch angle based on a difference between the trim activation signal 26 and a target trim efficiency reference 23. The target trim efficiency reference 23 can be a signal that indicates a desired efficiency level of the add-on members 17. For example, at high wind speed, it is desired that the pitch activation control device 24 controls the blade pitch angle in such a way that the active add-on members 17 have an efficiency level of 50%. The pitch angle for the blade 6A is designated as pitch position A, the pitch angle for the blade 6B is designated as pitch position B, and the pitch angle for the blade 6C is designated as pitch position C in FIG. 4.

In an alternative embodiment, the add-on member selection device 12 can be modified to control the add-on members 17 on the individual blades 6A, 6B, 6C instead of one common output to the add-on members 17 having the same position on the different blades 6A, 6B, 6C. This would enable a cyclic (rotor azimuth dependent) control or possible load reductions at the cost of system complexity.

For example, the embodiment of FIG. 4 is modified in that the add-on member selection device 12 outputs a first signal to the blade 6A, a second signal to the blade 6B and a third signal to the blade 6C.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling aerodynamic properties of a blade of a wind turbine, the blade comprising a predetermined number of add-on members which are actuated by a corresponding trim actuator to alter the aerodynamic properties of the blade, wherein each trim actuator is configured to hold an add-on member in a predetermined first position and a predetermined second position; wherein the method comprises:

determining a first number of add-on members which are to be held at the predetermined first position, and determining a second number of add-on members which are to be held at the predetermined second position, without receiving feedback from a sensor about positions of the first number of add-on members and the second number of add-on members; and actuating the first number of add-on members and the second number of add-on members with a trim activation signal in a digital on/off manner so that the first number of add-on members and the second number of add-on members only transition between a fully open position and a fully closed position.

2. The method according to claim 1, wherein a sum of the first and second numbers is equal to the predetermined number of the add-on members.

3. The method according to claim 1, wherein the predetermined first position is the fully closed position of the add-on member and the predetermined second position is the fully open position of the add-on member.

4. The method according to claim 1, further comprising: selecting specific add-on members of the second number on a basis of a trim activation signal which is determined based on a target rotor or generator speed reference.

5. The method according to claim 4, further comprising: altering the selected specific add-on members of the second number over time.

6. The method according to claim 1, further comprising: controlling a pitch angle of the blade based on a difference between a trim activation signal and a target trim efficiency reference.

7. The method according to claim 6, further comprising: controlling a pitch angle of each blade based on the difference between the trim activation signal and the target trim efficiency reference.

8. The method according to claim 1, wherein:

the method controls aerodynamic properties of a plurality of the blades of the wind turbine, determines for each blade the first number of add-on members which are to be held at the predetermined first position, and determines for each blade the second number of add-on members which are to be held at the predetermined second position.

9. The method according to claim 8, wherein the predetermined first positions of each blade are identical and/or the predetermined second positions of each blade are identical.

10. The method according to claim 8, wherein the first numbers of each blade are identical and/or the second numbers of each blade are identical.

* * * * *